United States Patent
Nishikawa et al.

(10) Patent No.: US 7,294,251 B2
(45) Date of Patent: Nov. 13, 2007

(54) PROCESS OF PRODUCING MASTER CARRIER FOR MAGNETIC TRANSFER

(75) Inventors: Masakazu Nishikawa, Kanagawa (JP); Seiji Kasahara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 400 days.

(21) Appl. No.: 10/916,527

(22) Filed: Aug. 12, 2004

(65) Prior Publication Data

US 2005/0042473 A1    Feb. 24, 2005

(30) Foreign Application Priority Data

Aug. 19, 2003  (JP)  ............... P. 2003-295327

(51) Int. Cl.
 *C25D 1/00* (2006.01)
(52) U.S. Cl. ............... 205/68; 205/67; 204/192.2
(58) Field of Classification Search ........... 205/67, 205/68, 70, 78; 360/17, 75; 204/192.1, 204/192.2
See application file for complete search history.

(56) References Cited

U.S. PATENT DOCUMENTS

| 6,347,016 B1 * | 2/2002 | Ishida et al. ............... 360/17 |
| 2002/0051306 A1 * | 5/2002 | Nishikawa et al. .......... 360/17 |

FOREIGN PATENT DOCUMENTS

| JP | 10-40544 A | 2/1998 |
| JP | 10-269566 A | 10/1998 |

\* cited by examiner

*Primary Examiner*—Edna Wong
*Assistant Examiner*—Luan V. Van
(74) *Attorney, Agent, or Firm*—Sughrue Mion Pllc.

(57) ABSTRACT

A process for producing a master carrier contains steps of: forming a desired pattern on a support to form a resist pattern support; forming a first ferromagnetic thin film on the resist pattern support by a vacuum film forming method; forming a third ferromagnetic thick film on the first ferromagnetic thin film by an electroplating; and peeling the support from the resist pattern support provided with the first ferromagnetic thin film and the third ferromagnetic thick film.

4 Claims, 4 Drawing Sheets

FIG. 3 (1)
FIG. 3 (2)
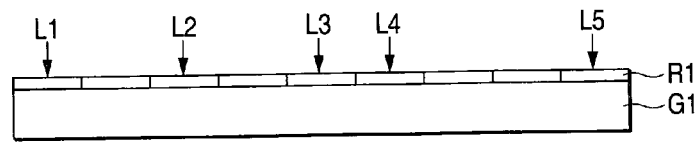
FIG. 3 (3)
FIG. 3 (4)
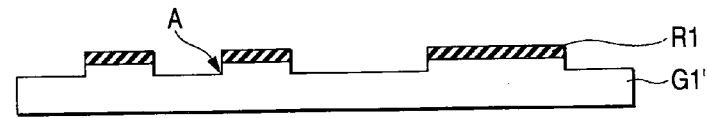
FIG. 3 (5)
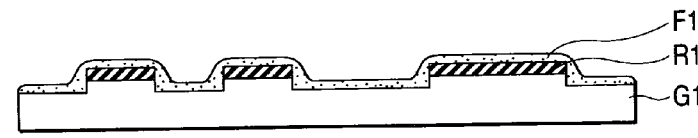
FIG. 3 (6)
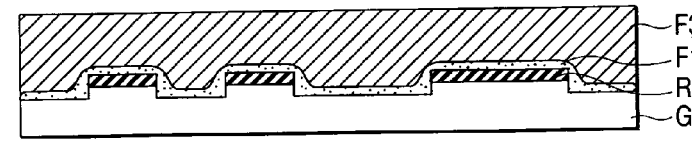
FIG. 3 (7)
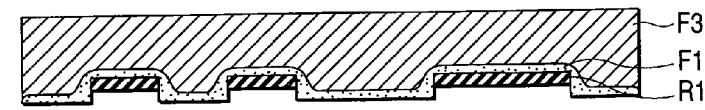
FIG. 3 (8)
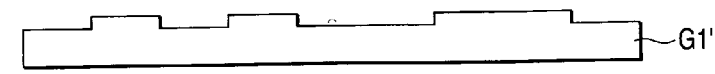
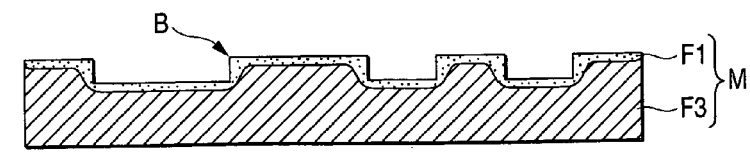
FIG. 3 (9)

FIG. 4 (6)
FIG. 4 (6)'
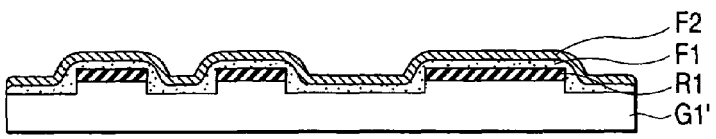
FIG. 4 (7)
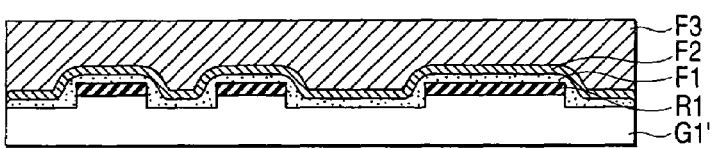
FIG. 4 (8)
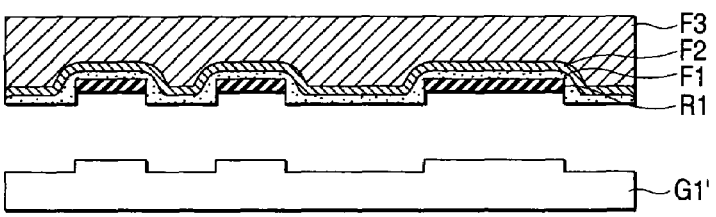
FIG. 4 (9)
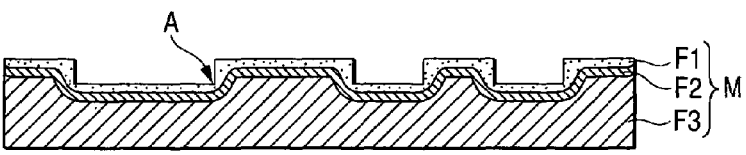

PROCESS OF PRODUCING MASTER CARRIER FOR MAGNETIC TRANSFER

BACKGROUND OF THE INVENTION

1. Field of the Invention

The present invention relates to a process of producing a master carrier for magnetic transfer having a projection pattern for bringing it into intimate contact with a slave medium to magnetically transfer a desired magnetic pattern onto the slave medium, especially a master carrier for magnetic transfer in which a deficiency is hardly generated in a magnetic layer thereof.

2. Description of the Related Art

In magnetic recording media, media capable of undergoing so-called high-speed access, which have a mass storage volume so as to record a large quantity of information following an increase of the information amount, are inexpensive, and preferably, are able to read out a necessary portion within a short period of time, are desired. As one example thereof, high-density magnetic disk media to be used in hard disk units or flexible disks (hereinafter referred to as "FD") are known. For the sake of realizing the mass storage volume, a so-called tracking servo technology in which a magnetic head accurately scans a narrow track width and reproduces a signal at a high S/N ratio bears a large role.

During one round of the disk, a servo signal for tracking, an address information signal, a reproduction clock signal, and the like are recorded at certain spacings as a so-called preformat. The magnetic head is set up in such a manner that it reads out such a signal of preformat and corrects its own position, whereby it can accurately run on the track.

At present, the foregoing preformat is prepared by writing the signals in every disk and in every track using a dedicated servo recording unit. The servo recording unit is provided with a magnetic head having, for example, a head width of about 75% of the track pitch. First, a disk is rotated in the state that the magnetic head is made closed to the disk, and signals of each track are written while moving the magnetic head every a half track pitch.

Since the foregoing servo recording unit is expensive and takes a lot of time for preparing a preformat, this step occupies the majority of the production costs. Thus, it is demanded to realize a low cost.

Then, a method of realizing this by magnetic transfer in place of writing of a preformat in every track is proposed (for example, see U.S. Pat. No. 6,347,016).

In this magnetic transfer, a master carrier having a projection pattern corresponding to information that is to be transferred onto a slave medium as a medium to be magnetically transferred, such as a magnetic disk medium, is prepared, and a transfer magnetic field is applied in the sate that the master carrier and the slave medium come into intimate contact with each other, thereby transferring a magnetic pattern corresponding to information (for example, servo signals) carried by the projection pattern of the master carrier onto the slave medium. According to this system, recording can be statically performed without changing the relative position between the master carrier and the slave medium, accurate preformat recording can be achieved, and the time required for recording is extremely short.

For the sake of enhancing the transfer quality in the foregoing magnetic transfer, how the master carrier is durable to the order of several thousands sheets in the good intimate contact state without causing breakage is important. That is, if the intimate contact fails, regions where the magnetic transfer does not take place are generated. If no magnetic transfer takes place, signal failure is generated in the magnetic information to be transferred onto the slave medium, leading to a lowering of the signal quality. In the case where the recorded signal is a servo signal, a sufficient tracking function is not obtained, resulting in a lowering of reliability.

FIG. 5 shows the production steps of a master carrier for magnetic transfer according to the related art.

According to this, a nickel (Ni) conductive layer is formed on a silicon support G1' having formed thereon a pattern of a resist (R1) with projections, and a third ferromagnetic thick film F3 made of nickel as the major component is then formed by electroplating (see FIG. 5-(6)); and this is peeled from the resist pattern support G1' to separate a resist R1 contact part of the third ferromagnetic thick film F3 side from a part (b) of the resist pattern support G1 (see FIG. 5-(7)).

After the separation, when the resist R1 of a part (a) of the third ferromagnetic thick film F3 side and dusts are cleaned up and removed by means of $O_2$ ashing, etc., a nickel original plate F3 is obtained (see FIG. 5-(8)). A magnetic layer film F1 is laminated thereon by the sputtering method, whereby a master carrier M for magnetic transfer is obtained (see FIG. 5-(9)).

As the resist pattern support G1', nickel, silicon, quartz plate, glass, aluminum, ceramics, synthetic resins, and the like are used. As magnetic materials of the magnetic layer film F1, Co, Co alloys (for example, CoNi, CoNiZr, and CoNbTaZr), Fe, Fe alloys (for example, FeCo, FeCoNi, FeNiMo, FeAlSi, FeAl, and FeTaN), Ni, and Ni alloys (for example, NiFe) are used.

As materials of the metal support F3, Ni or Ni alloys, etc. can be used. As the plating for preparing this support, a variety of metallic film formation methods including electroless plating, electroplating, sputtering, and ion plating were applied.

In the foregoing related art methods, the Ni conductive layer was provided on the resist support G1' by film formation and subjected to electroplating to prepare the patterned Ni support F3; and the magnetic layer F1 was formed thereon by the sputtering method to form the master carrier M for magnetic transfer. When a number of sheets of slave media were subjected to magnetic transfer using the thus obtained master carrier M for magnetic transfer, transfer failure and breakage of the slave media occurred in the order of several thousands sheets.

Since it was thought that this is caused due to breakage of the master, the master was analyzed. As a result, it was ascertained that the magnetic layer formed on the patterned Ni support failed.

As a result of further investigations, it was noted from factorial separation experiments performed while taking the film thickness of the magnetic layer, etc. as a parameter that an internal stress in the magnetic layer was larger than the adhesive strength between the support and the magnetic layer, whereby peeling of the magnetic layer occurred therein.

It was noted that this phenomenon is liable to take place in the case of fine patterns of not more than 100 nm.

For the purpose of enhancing the adhesive strength, it was attempted to reduce the internal stress by changing the conditions of the Ni support surface treatment and the magnetic layer film formation. As a result, though a certain effect could be confirmed, a large enhancement was not achieved yet. In the light of the above, it was concluded that an improvement in the pattern coating property is necessary while ensuring an adhesive strength of a certain level or more between the magnetic layer and the Ni support.

In the foregoing related art methods, for example, if a soft magnetic layer made of FeCo is formed on the projection pattern formed by the Ni electroplating by the vacuum film forming method (for example, the spattering method), duration of FeCo piling (in the spattering process), it is rare that FeCo is piling on the projection while keeping the width of the projection, but FeCo is piling while also widening in the width direction. Therefore, in the projection pattern being finer than 100 nm, the piled FeCo films contact one another between adjacent projections, resulting in disordering of the pattern shape.

SUMMARY OF THE INVENTION

Accordingly, it is an object of the present invention to provide a process of producing a master carrier for magnetic transfer. That is, by previously forming a ferromagnetic thin film (F1) that has hitherto been prepared in the final step on a resist support and performing electroplating using this ferromagnetic thin film as a conductive layer, an electrodynamic alloying step can be realized, thereby achieving a large enhancement of the adhesive strength, and in addition thereto, by forming the ferromagnetic thin film (F1) on the resist pattern, the pattern coating property can be improved by the formation of the ferromagnetic thin film (F1).

Specifically, a first aspect of the invention is concerned with a process of producing a master carrier for magnetic transfer, the process comprising: forming a support having a projection pattern in accordance with a desired information on a surface of the support; forming a first ferromagnetic thin film (F1) on the support having the projection pattern by the vacuum film forming method; forming a third ferromagnetic thick film (F3) on the first ferromagnetic thin film (F1) by electroplating; and peeling the support from the support provided with the first ferromagnetic thin film and the third ferromagnetic thick film.

It must be noted that the term "a projection pattern" comprises a projection and a depression, however the term "depression" as used herein indicates a portion between one projection and another projection. In addition, The above mentioned "a support having a projection pattern in accordance with a desired information on a surface" includes such supports, in which (i) the projection pattern is formed on a flat support (for example, a glass plate, a silicone wafer or the like) by use of a photo resist (the projection is composed of the photo resist), (ii) in the above (i), the photo resist in the projection is subjected, as an etching resist, to a further etching treatment, and the resistless support is treated on the surface with the etching, (iii) in the above (ii), the photo resist composing the projection is removed, and the projection are formed on the surface itself of the support, and (iv) the metal plate or the like is the plate of the above (i) or (ii) having, on the surface, the projection made of the metal (for example, Ni) by the electroforming.

It is preferred that the third ferromagnetic thick film (F3) is made of nickel (Ni) as the major component.

It is more preferably that a second ferromagnetic thin film (F2) constituted of an element the same as in the third ferromagnetic thick film (F3) is formed between the first ferromagnetic thin film (F1) and the third ferromagnetic thick film (F3) by the vacuum film forming method.

It is much more preferably that the second ferromagnetic thin film (F2) has a film thickness (dF2) in the range of from 10 nm to 100 nm.

It is most preferably that a saturation magnetization (MsF1) of the first ferromagnetic thin film (F1) and a saturation magnetization (MsF3) of the third ferromagnetic thick film (F3) are in the relation of (MsF1/MsF3)>1.

A second aspect of the invention is concerned with a magnetic transfer medium having servo information recorded therein by the magnetic transfer method using a master carrier for magnetic transfer produced by the production process as set forth in the first aspect.

A third aspect of the invention is concerned with a process of producing a preformatted magnetic recording medium, which comprises the steps of: preparing a master carrier, preparing a slave medium comprising a non-magnetic support having a magnetic recording layer thereon, initially magnetizing the magnetic recording layer of said slave medium to a predetermined direction, bringing a surface of the master carrier into intimate contact with the magnetic recording layer of the slave medium at a predetermined pressure to form a conjoined body, and applying a transfer magnetic field to the conjoined body in a direction opposite to the predetermined direction, thereby obtaining the magnetic recording medium having the recorded data, wherein the master carrier is produced by the process as set forth in the first aspect.

In the light of the above, by previously forming the ferromagnetic thin film (F1) and performing electroplating using this ferromagnetic thin film as a conductive layer, an electrodynamic alloying step can be realized, thereby achieving a large enhancement of the adhesive strength, and in addition thereto, by forming the ferromagnetic thin film (F1) on the resist pattern, the pattern coating property can be improved by the formation of the ferromagnetic thin film (F1).

BRIEF DESCRIPTION OF THE DRAWING

FIG. 2 is a view to explain the basic steps of this magnetic transfer, in which FIG. 2A shows a step of applying a magnetic field in one direction to subject the slave medium to initial direct-current magnetization; FIG. 2B shows a step of bringing the master carrier and the slave medium into intimate contact with each other and applying a magnetic field in the opposite direction; and FIG. 2C shows the state after the magnetic transfer.

FIG. 3 shows a process of producing a master carrier for magnetic transfer according to a first embodiment of the invention.

FIG. 4 shows a process of producing a master carrier for magnetic transfer according to a second embodiment of the invention.

DETAILED DESCRIPTION OF THE INVENTION

A best mode for carrying out the invention will be described below in detail with reference to the accompanying drawings.

First of all, basic steps of magnetic transfer for transferring information onto a slave medium using a master carrier will be described with reference to FIGS. 1 and 2.

Figure 1:
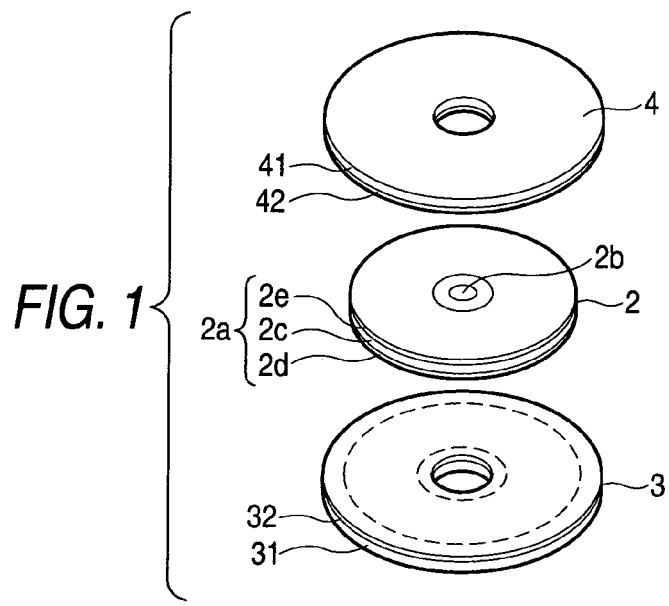
FIG. 1 is a slant view to show a slave medium 2 and mater carries 3, 4.

FIG. 1 is a slant view to show a slave medium 2 and master carriers 3, 4.

For example, the slave medium 2 is a flexible disk in which a hub 2b is fixed in the center of a disk-like recording medium 2a, and the recording medium 2a has recording surfaces 2d, 2e having a magnetic body layer formed thereon on the both surfaces of a disk-like base 2c made of a non-magnetic body such as a flexible polyester sheet.

Also, the master carriers 3, 4 are each formed of a rigid body on a ring-like disk, on one surface of which is provided a transferred information-carrying surface having formed thereon a fine projection pattern to come into intimate contact with the recording surfaces 2d, 2e of the slave medium 2, respectively. In the master carriers 3, 4, a projection pattern is formed for the lower-side recording surface 2d and the upper-side recording surface 2e of the slave medium 2, respectively. When the master carrier 3 is exemplified, the projection pattern is formed within a doughnut-shaped region surrounded by dotted lines in the drawing. Incidentally, the master carriers 3, 4 as shown in FIG. 1 are constructed of supports 31, 41 having a projection pattern formed thereon and soft magnetic layers 32, 42 formed on the projection pattern, respectively. By providing the magnetic layers having good transfer characteristics in this way, it is possible to undergo good magnetic transfer.

In the case where the support is a non-magnetic body, it is necessary to provide a magnetic layer.

Also, in the case where a support made of a ferromagnetic metal is used, and a magnetic layer is coated on its projection pattern surface, for the sake of avoiding the magnetic influence of the support, it is preferred to provide a non-magnetic layer between the support and the magnetic layer. Further, by coating a protective film such as diamond-like carbon (DLC) in the uppermost layer, contact durability is enhanced by this protective film so that it becomes possible to undergo magnetic transfer of a number of times. Moreover, an Si film may be formed beneath the DLC protective film by means of sputtering, etc.

Figure 2:
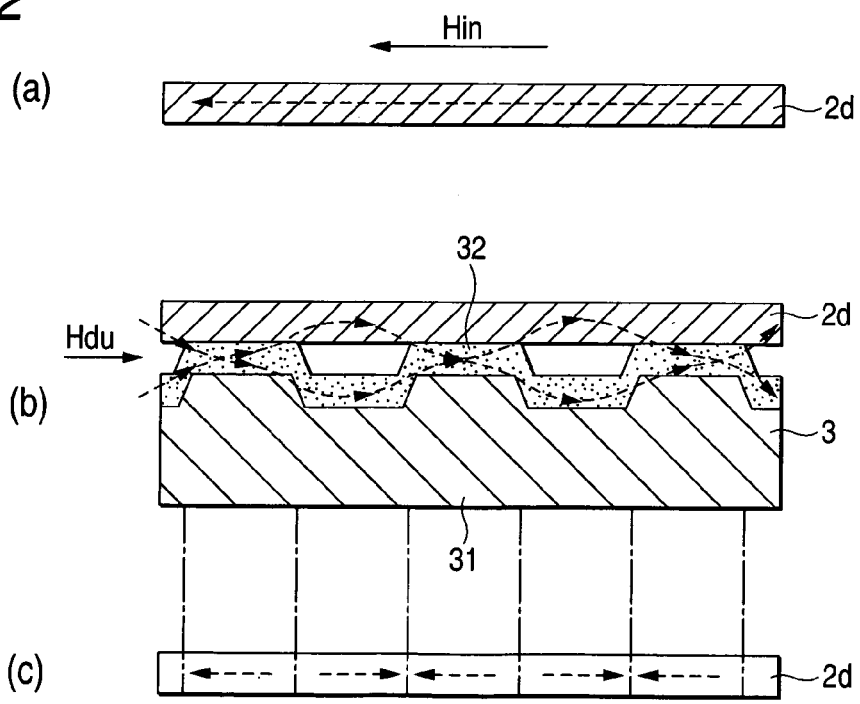
Figure 5:
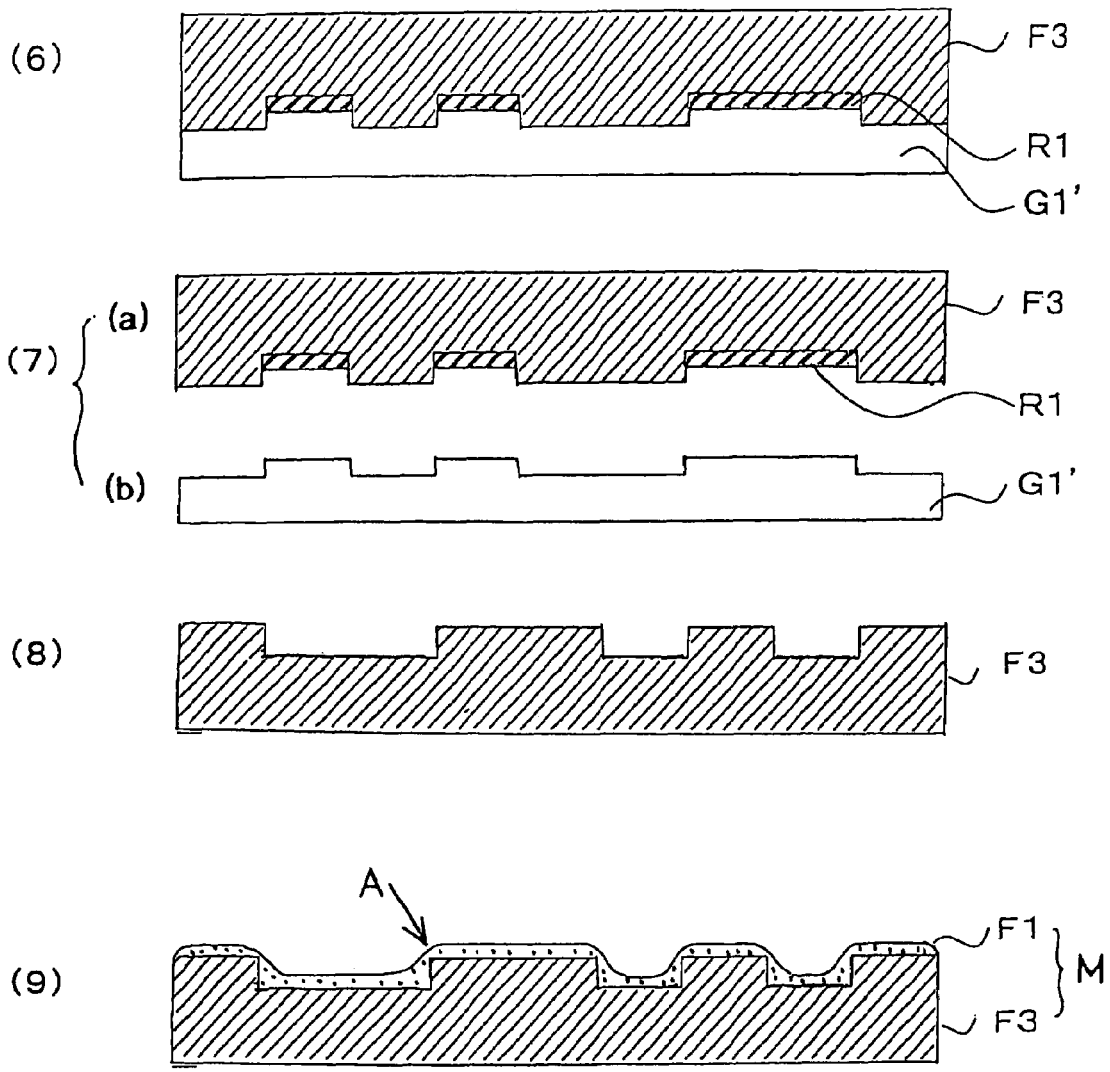
FIG. 5 shows a process of producing a master carrier for magnetic transfer according to the related art.

FIG. 2 is a view to explain the basic steps of this magnetic transfer, in which FIG. 2A shows a step of applying a magnetic field in one direction to subject the slave medium to initial direct-current magnetization; FIG. 2B shows a step of bringing the master carrier and the slave medium into intimate contact with each other and applying a magnetic field in the opposite direction; and FIG. 2C shows the state after the magnetic transfer. Incidentally, in FIG. 2, with respect to the slave medium 2, only its lower recording surface 2d is shown.

As shown in FIG. 2A, an initial magnetic field Hin is previously applied to the slave medium 2 in one direction of the track direction, thereby undergoing initial magnetization (direct-current demagnetization). Thereafter, as shown in FIG. 2B, the recording surface 2d of this slave medium 2 is brought into intimate contact with an information-carrying surface coated with the magnetic layer 32 on a fine projection pattern of the support 31 of the master carrier 3, and a transfer magnetic field Hdu is applied in the opposite direction to the foregoing initial magnetic field in the track direction of the slave medium 2, thereby undergoing magnetic transfer. As a result, as shown in FIG. 2C, information (for example, a servo signal) corresponding to the projection pattern of the master carrier 3 is magnetically transferred and recorded on the magnetic recording surface (track) of the master carrier 3. Here, while the lower-side recording surface 2d of the slave medium 2 and the lower-side master carrier 3 have been explained, the upper-side recording surface 2e of the slave medium 2 is brought into intimate contact with the upper-side master carrier 4, thereby undergoing magnetic transfer in the same manner as shown in FIG. 1. The magnetic transfer onto the upper and lower recording surfaces 2d, 2e of the slave medium 2 may be carried out at the same time or successively for every surface.

Also, even in the case where the projection pattern of the master carrier 3 is a negative pattern having a projection shape reverse to the positive pattern shown in FIG. 2, by reversing the direction of the initial magnetic field Hin and the direction of the transfer magnetic field Hdu, it is possible to magnetically transfer and record the same information. Incidentally, with respect to the initial magnetic field and the transfer magnetic field, it is necessary to employ values defined while taking into account a holding power of the slave medium and relative magnetic permeability of each of the master carriers and the slave medium.

FIG. 3 shows a process of producing a master carrier for magnetic transfer according to a first embodiment of the invention. The process of producing a master carrier for magnetic transfer will be described below based on this drawing.

First of all, the surface of a silicon disk (or a glass disk) G1 is polished smoothly (see FIG. 3-(1)); and after coating a resist contact liquid thereon, a positive working resist liquid is coated by spin coating, etc. and then baked to form a resist R1 (see FIG. 3-(2)).

Laser beams (or electron beams) L1, L2, . . . , L6 modulated corresponding to a servo signal (or its mirror symmetric signal) are irradiated in a specified site of this resist R1, thereby exposing and drawing a prescribed tracking pattern on the resist R1 on the whole surface of the disk G1 (see FIG. 3-(3)). (Incidentally, for the purpose of making the specified site of the resist R1 easy to see, hatching is omitted only in FIG. 3-3, but the hatching should be originally given likewise other drawings.) After baking again, the resist R1 is developed to remove exposed areas, thereby forming a projection shape by the resist R1 (see FIG. 3-(4)).

The disk G1 is etched from the projection shape side of the resist R1. In this way, convex parts protected by the resist R1 remain, whereas concave parts not protected by the resist R1 (for example, an arrow part A) are eroded into the silicon disk G1 (see FIG. 3-(5)).

On the resulting resist pattern support G1' having projections formed thereon, a first ferromagnetic thin film F1 is first formed by the vacuum film forming method such as sputtering and vapor deposition (see FIG. 3-(6)). This step is a characteristic feature of the invention. As the first ferromagnetic thin film F1, an FeCo alloy having good absorption of the magnetic field is adequate.

Further, a third ferromagnetic thick film F3 is formed on this first ferromagnetic thin film F1 by means of electroplating (see FIG. 3-(7)). The third ferromagnetic thick film F3 is preferably made of nickel (Ni) as the major component. Incidentally, the height of the projections is in the order of 100 nm, and the thickness of the third magnetic thick film F3 is in the order of 300 μm.

As the resist pattern support G1', nickel, silicon, quartz plate, glass, aluminum, ceramics, synthetic resins, and the like are used.

As magnetic materials of the magnetic layer film F1, Co, Co alloys (for example, CoNi, CoNiZr, and CoNbTaZr), Fe, Fe alloys (for example, FeCo, FeCoNi, FeNiMo, FeAlSi, FeAl, and FeTaN), Ni, and Ni alloys (for example, NiFe) are used.

As materials of the metal support F3, Ni or Ni alloys, etc. can be used.

This is then peeled from the resist pattern support G1' so as to separate a part (a) of the third ferromagnetic thick film F3 side from a part (b) of the resist pattern support G1 (see FIG. 3-(8)).

When peeling off, for preventing physical destructions of the support, an easily peeling layer may be provided between the support G1' (R1) and the ferromagnetic thin film F1. The easily peeling layer is desirably composed with chemically inactive substances. In particular, a carbon based easily peeling layer (DLC, or spattering C) is desirable.

The easily peeling layer has a thickness of from 2 to 10 nm, preferably about 3 to 7 nm. Being less than 2 nm, the easily peeling layer does not accomplish the functions. Being more than 10 nm, the pattern coating property of the ferromagnetic thin film F1 is lowered. After peeling, the easily peeling layer may be used as a protecting layer.

After the separation, by removing the resist R1 of the part (a) of the first ferromagnetic thin film F1 side by means of $O_2$ ashing, etc., a master carrier M for magnetic transfer, which is a reversed plate, is prepared. When the resulting master carrier M for magnetic transfer is seen, it is noted that a master carrier for magnetic transfer in which the first ferromagnetic thin film F1 is formed in the right-angled state without causing rounding of the pattern shape (shoulder collapse) (see an arrow site B) is obtained in the projection parts of the third ferromagnetic thick film F3 (see FIG. 3-(9)).

FIG. 4 shows a process of producing a master carrier for magnetic transfer according to a second embodiment of the invention. The process of producing a master carrier for magnetic transfer will be described below based on this drawing.

In the production process according to the second embodiment, since the steps (1) to (6) for preparing a resist pattern support G1' having projections formed thereon are the same as in FIG. 3, the explanation will be omitted.

After forming a first ferromagnetic thin film F1 made of an FeCo alloy on a resist pattern support G1' having projections formed thereon by the sputtering method, the vapor deposition method, etc. (see FIG. 4-(6)), according to the second embodiment, a second ferromagnetic thin film F2 constructed of an element the same as in a third ferromagnetic thick film F3 is formed on this first ferromagnetic thin film F1 by the sputtering method (see FIG. 4-(6')). The second ferromagnetic thin film F2 preferably has a thickness (dF2) in the range of from 10 nm to 100 nm. Thereafter, a third ferromagnetic thick film F3 made of nickel (Ni) as the major component is formed on the second ferromagnetic thin film F2 by means of electroplating (see FIG. 4-(7)); and this is then peeled from the resist pattern support G1', thereby separating it into a part (a) of the third ferromagnetic thick film F3 side and a part (b) of the resist pattern support G1 (see FIG. 4-(8)). After the separation, by removing a resist R1 of the part (a) of the third ferromagnetic thick film F3 side by $O_2$ ashing, etc., a master carrier M for magnetic transfer, which is a reversed plate, is prepared.

In the light of the above, according to the second embodiment of the invention, the second ferromagnetic thin film F2 constructed of an element the same as in the third ferromagnetic thick film F3 is formed between the first ferromagnetic thin film (FeCo) F1 and the third ferromagnetic thick film F3 by the sputtering method. This is because if foreign matters (for example, FeCo) are incorporated into a plating bath, there is some possibility of occurrence of deposition of impurities upon reduction, and therefore, any possibility is eliminated in advance by providing the thin layer of Ni on FeCo.

When the resulting plate is seen, it is noted that a master carrier for magnetic transfer in which the first ferromagnetic thin film F1 is formed in the right-angled state without causing rounding of the pattern shape (shoulder collapse) (see an arrow site A) is obtained in the projection parts of the third ferromagnetic thick film F3 (see FIG. 4-(9)).

Also, it is preferable that the relation between a saturation magnetization (MsF1) of the first ferromagnetic thin film (F1) and a saturation magnetization (MsF3) of the third ferromagnetic thick film (F3) are in the relation represented by the following expression (1).

$$(MsF1/MsF3) > 1 \tag{1}$$

The reason for this is as follows. That is, in the case where signal recording is performed by means of magnetic transfer, it is necessary that the pattern part of the master carrier efficiently absorbs and releases many magnetic fluxes. For achieving this, it is necessary that the master magnetic layer in the vicinity of the slave, which contributes most likely to the signal recording, is unsaturated at the time of magnetic transfer and has a high saturation magnetization.

Accordingly, by meeting the relation represented by the foregoing expression (1), even when the third ferromagnetic thick film (F3) is saturated, the first ferromagnetic thin film (F1) is still not saturated and has high convergent and releasing characteristics of magnetic fluxes. Thus, it is possible to realize magnetic transfer with a good signal quality.

The invention will be described below with reference to the following Examples.

EXAMPLES

A chemical sensitization type resist was coated in a thickness of 100 nm on an 8-inch Si wafer, and a resist pattern of radiant lines having a pitch length of 0.15 μm, a track width of 1.0 μm, a track pitch of 1.1 μm, and a groove depth of 0.1 μm was formed in a radius region to the position of from 20 mm to 40 mm in the radius direction from the rotation center using electron beams.

Thereafter, a soft magnetic layer made of 25 atomic % of FeCo was prepared in a thickness of 100 nm on this resist pattern at a support temperature of 25° C.

An Ar sputtering pressure was set up at 0.15 Pa (1.08 mTorr). An input electric power was set up at 2.80 W/cm².

After forming 25 atomic % of FeCo in a thickness of 100 nm, Ni electroplating was performed in a thickness of an (Ni) support of 0.3 mm. After electroplating, isolation from the resist support and cleaning were carried out to prepare a master carrier, which was then provided for use.

A glass plate was heated at 200° C. under a condition adjusted in a vacuum film formation unit (S-50S sputtering unit, manufactured by Shibaura Mechatronics Corporation) by reducing the pressure to $1.33 \times 10^{-5}$ Pa ($1.0 \times 10^{-7}$ Torr) at room temperature and then introducing argon to set up the pressure at 0.4 Pa (3.0 mTorr), to prepare a 3.5-inch type disk-like magnetic recording medium containing 30 nm of CrTi and 30 nm of CoCrPt and having an Ms of 5.7 T (4,500 gauss) and a cohesive force Hc of 199 kA/m (25,000 e), which was then used as an inplane slave medium.

1) Evaluation Method of Master Durability:

Using the same master carrier, the contact pressure between the master carrier and the slave medium was set up at $7.4 \times 10^{-3}$ Pa (7.5 kgf/cm²), and contact and peeling were repeated 10,000 times. Thereafter, the master surface was observed at random with respect to 500 visual fields at a magnification of 480 times using a differential interference microscope. In the 500 visual fields, the master durability was evaluated according to the following criteria.

(a) Good (○): The number of portions where a deposit or crack is formed is less than three.

(b) Bad (X): The number of portions where a deposit or crack is formed is three or more.

2) Electromagnetic Transformation Characteristics:

2-1) All of the slave media were placed in an electromagnetic transformation characteristic analyzer (SS-60, manufactured by Kyodo Denshi System Co., Ltd.) (heads: GMR heads having a reproducing head gap of 0.12 μm, a reproducing track width of 0.45 μm, a recording head gap of 0.18 μm, and a recording track width of 0.51 μm), and the line speed at a radius of 40 mm was set up at 10 m/sec. A read signal was subjected to frequency division by a spectroanalyzer, and a difference (C/N) of a peak intensity (C) of a primary signal to an externally pressed medium nozzle (N) was measured.

A relative C/N was evaluated according to the following criteria based on the C/N value of the head recording signal.

(a) Good (○): The relative C/N value is less than −3.0 dB.

(b) Moderate (Δ) The relative C/N value is from −3.0 to −4.0 dB.

(c) Bad (X): The relative C/N value is −4.0 dB or more.

2-2) In addition, a ratio (Wdup/Whead) of a transfer recording carrier peak line (Wdup) to a head recording product (Whead) was evaluated according to the following criteria.

(a) Stable (○): The Wdup/Whead ratio is not more than 1.

(b) Instable (X): The Wdup/Whead ratio exceeds 1.

In Example 1, an F1 layer having a thickness of 100 nm was formed of FeCo (Co: 25%) before electroplating.

In Examples 2 to 5, magnetic transfer was carried out in the same manner as in Example 1, except for changing the material quality and thickness of F1 as shown in Table 1. That is, an F1 layer having a thickness of 200 nm was formed of FeCo (Co: 25%) in Example 2; an F1 layer having a thickness of 100 nm was formed of FeCo (Co: 30%) in Example 3; an F1 layer having a thickness of 500 nm was formed of FeCo (Co: 30%) in Example 4; and an F1 layer having a thickness of 500 nm was formed of Ni in Example 5, respectively.

Example 6

Except using as the plate a support formed with the pattern (depth: 100 nm) on the resist pattern support itself from the RIE method, the master carrier for magnetic transfer is the same as that of Example 1.

Example 7

Except using the Ni support made by the plating to the root of the resist pattern support, the master carrier for magnetic transfer is the same as that of Example 1.

Example 8

Except forming the DLC film of 1 nm between the pattern support/F1, the master carrier for magnetic transfer is the same as that of Example 6.

Example 9

Except forming DLC film of 5 nm between the pattern support/F1, the master carrier for magnetic transfer is the same as that of Example 6.

Example 10

Except forming DLC film of 13 nm between the pattern support/F1, the master carrier for magnetic transfer is the same as that of Example 6.

In Comparative Example 1, magnetic transfer was carried out in the same manner as in Example 1, except that a magnetic layer was formed on a patterned support after completion of Ni electroplating.

In Comparative Example 2, magnetic transfer was carried out in the same manner as in Example 2, except that a magnetic layer was formed on a patterned support after completion of Ni electroplating.

In Comparative Example 3, magnetic transfer was carried out in the same manner as in Example 4, except that a magnetic Layer was formed on a patterned support after completion of Ni electroplating.

The results obtained are shown in Table 1.

TABLE 1

| | Order of F1 formation | Formation of F1 layer | Easily peeling layer (nm) | MsF1/ MsF3 | Adhesion | | Electromagnetic transformation characteristics | | | |
|---|---|---|---|---|---|---|---|---|---|---|
| | | | | | Master durability | Judgment | Relative C/N (dB) | Judgment | Line width | Stability |
| Example 1 | Before electro-plating | FeCo 25 atomic % - 100 nm | Non | 2.50 | 0 | ○ | 0 | ○ | 0.9 | ○ |
| Example 2 | Before electro-plating | FeCo 25 atomic % - 200 nm | Non | 2.50 | 1 | ○ | −0.1 | ○ | 0.8 | ○ |
| Example 3 | Before electro-plating | FeCo 30 atomic % - 100 nm | Non | 3.10 | 0 | ○ | 0.1 | ○ | 0.9 | ○ |
| Example 4 | Before electro-plating | FeCo 30 atomic % - 500 nm | Non | 2.80 | 1 | ○ | −0.2 | ○ | 1 | ○ |
| Example 5 | Before electro-plating | Ni - 200 nm | Non | 1.00 | 1 | ○ | −3.4 | Δ | 0.9 | ○ |

TABLE 1-continued

| | Order of F1 formation | Formation of F1 layer | Easily peeling layer (nm) | MsF1/ MsF3 | Adhesion | | Electromagnetic transformation characteristics | | | |
|---|---|---|---|---|---|---|---|---|---|---|
| | | | | | Master durability | Judgment | Relative C/N (dB) | Judgment | Line width | Stability |
| Example 6 | Before electro-plating | FeCo 25 atomic % - 100 nm | Non | 2.50 | 1 | ○ | −0.8 | ○ | 0.95 | ○ |
| Example 7 | Before electro-plating | FeCo 25 atomic % - 100 nm | Non | 2.50 | 2 | ○ | −0.6 | ○ | 0.98 | ○ |
| Example 8 | Before electro-plating | FeCo 25 atomic % - 100 nm | DCL-1 nm | 2.50 | 1 | ○ | −0.9 | ○ | 0.96 | ○ |
| Example 9 | Before electro-plating | FeCo 25 atomic % - 100 nm | DCL-5 nm | 2.50 | 0 | ○ | −1.1 | ○ | 0.97 | ○ |
| Example 10 | Before electro-plating | FeCo 25 atomic % - 100 nm | DCL-13 nm | 2.50 | 0 | ○ | −2.3 | ○ | 0.99 | ○ |
| Comparative Example 1 | After electro-plating | FeCo 25 atomic % - 100 nm | Non | 2.60 | 3 | X | −0.5 | ○ | 1.1 | X |
| Comparative Example 2 | After electro-plating | FeCo 25 atomic % - 200 nm | Non | 2.60 | 4 | X | −1 | ○ | 1.2 | X |
| Comparative Example 3 | After electro-plating | FeCo 30 atomic % - 500 nm | Non | 2.70 | 10 | X | −5.2 | X | 1.9 | X |

In Table 1, Examples 1 to 4, and 6 to 10 exhibit "○" in both the adhesion and the electromagnetic transformation characteristics (relative C/N and Wdup/Whead); and Example 5 exhibits "○", except that the relative C/N of the electromagnetic transformation characteristics is "Δ".

In contrast, Comparative Examples 1 to 3 exhibited "X" in both the adhesion and Wdup/Whead.

From these results, it could be confirmed that the method of the invention in which a first ferromagnetic thin film (F1) is first formed on a resist pattern support by the sputtering method, and a third ferromagnetic thick film (F3) is then formed on this first ferromagnetic thin film (F1) by means of electroplating is an extremely effective method.

In contrast, it could be proven that the related art method in which an Ni conductive layer is subjected to film formation on a resist support, electroplating is performed to form a patterned Ni support, and a magnetic layer is then formed thereon by the supporting method is inferior.

The present invention is not limited to the specific above-described embodiments. It is contemplated that numerous modifications may be made to the present invention without departing from the spirit and scope of the invention as defined in the following claims.

This application is based on Japanese Patent application JP 2003-295327, filed Aug. 19, 2003, the entire content of which is hereby incorporated by reference.

What is claimed is:

1. A process of producing a master carrier, which comprises:

forming a support having a projection pattern in accordance with a desired information on a surface of said support;

forming a first ferromagnetic thin film on said support having said projection pattern by a vacuum film forming method;

forming a second ferromagnetic thin film between said first ferromagnetic thin film a third ferromagnetic thick film by said vacuum film forming method;

forming said third ferromagnetic thick film on said first ferromagnetic thin film by an electroplating method and;

wherein said first ferromagnetic thin film has a first saturation magnetization, said third ferromagnetic thick film has a third saturation magnetization, and a ratio of said first saturation magnetization to said third saturation magnetization is larger than 1;

peeling said support from said support provided with said first ferromagnetic thin film and said third ferromagnetic thick film.

2. The process of producing a master carrier according to claim 1, wherein said third ferromagnetic thick film comprises nickel.

3. The process of producing a master carrier according to claim 1, where said second ferromagnetic thin film and said third ferromagnetic thick film comprise a same element.

4. The process of producing a master carrier according to claim 3, wherein said second ferromagnetic thin film has a film thickness of 10 nm to 100 nm.

* * * * *